United States Patent
Lin et al.

(10) Patent No.: US 10,230,096 B2
(45) Date of Patent: Mar. 12, 2019

(54) ELECTRODE AND METHOD FOR MANUFACTURING THE SAME AND BATTERY

(71) Applicant: INDUSTRIAL TECHNOLOGY RESEARCH INSTITUTE, Hsinchu (TW)

(72) Inventors: Chia-Nan Lin, Zhuqi Township (TW); Jason Fang, Taipei (TW); Chih-Ching Chang, Hsinchu (TW); Chun-Lung Li, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 215 days.

(21) Appl. No.: 14/984,536

(22) Filed: Dec. 30, 2015

(65) Prior Publication Data

US 2017/0162861 A1  Jun. 8, 2017

(30) Foreign Application Priority Data

Dec. 3, 2015  (TW) .............................. 104140491 A

(51) Int. Cl.
*H01M 4/136* (2010.01)
*H01M 4/1397* (2010.01)
(Continued)

(52) U.S. Cl.
CPC ......... *H01M 4/136* (2013.01); *H01M 2/1653* (2013.01); *H01M 4/0435* (2013.01);
(Continued)

(58) Field of Classification Search
CPC ........ H01M 4/02–4/0497; H01M 4/13; H01M 4/133; H01M 4/136; H01M 4/139;
(Continued)

(56) References Cited

U.S. PATENT DOCUMENTS

| 9,029,016 B2 | 5/2015 | Lee et al. | |
| 2011/0269017 A1* | 11/2011 | Sakamoto | H01M 4/13 429/217 |

(Continued)

FOREIGN PATENT DOCUMENTS

| CN | 103050667 A | 4/2013 |
| CN | 203631665 U | 6/2014 |

(Continued)

OTHER PUBLICATIONS

Taiwanese Office Action and Search Report for Taiwanese Application No. 104140491, dated Jun. 15, 2016.

(Continued)

*Primary Examiner* — Jonathan G Leong
*Assistant Examiner* — Jacob Buchanan
(74) *Attorney, Agent, or Firm* — Birch, Stewart, Kolasch & Birch, LLP

(57) ABSTRACT

An electrode is provided, which includes a sulfur- and carbon-containing layer having a carbon material, a sulfur material, and a binder. A sulfur content at a core part of the sulfur- and carbon-containing layer is gradually reduced to a sulfur content at two side surfaces of the sulfur- and carbon-containing layer. The electrode may serve as a positive electrode of a battery. The battery also includes a negative electrode, and an electrolyte liquid between the positive electrode and the negative electrode.

12 Claims, 12 Drawing Sheets

(51) Int. Cl.
  *H01M 4/38* (2006.01)
  *H01M 10/0525* (2010.01)
  *H01M 10/0569* (2010.01)
  *H01M 2/16* (2006.01)
  *H01M 4/04* (2006.01)
  *H01M 4/36* (2006.01)
  *H01M 4/587* (2010.01)
  *H01M 4/62* (2006.01)
  *H01M 4/66* (2006.01)
  *H01M 10/0568* (2010.01)
  *H01M 4/02* (2006.01)

(52) U.S. Cl.
  CPC ......... *H01M 4/1397* (2013.01); *H01M 4/364* (2013.01); *H01M 4/38* (2013.01); *H01M 4/382* (2013.01); *H01M 4/587* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2300/0037* (2013.01)

(58) Field of Classification Search
  CPC ............ H01M 4/1393; H01M 4/1397; H01M 4/38–4/382; H01M 4/58; H01M 4/5815; H01M 4/583; H01M 4/587; H01M 10/05–10/0525
  See application file for complete search history.

(56) References Cited

U.S. PATENT DOCUMENTS

| | | | | |
|---|---|---|---|---|
| 2013/0183547 | A1* | 7/2013 | Kourtakis | H01M 4/62 429/50 |
| 2013/0309572 | A1* | 11/2013 | Zhang | H01M 4/13 429/217 |
| 2014/0342214 | A1 | 11/2014 | Wegner et al. | |
| 2015/0017486 | A1 | 1/2015 | Lai | |
| 2015/0318532 | A1* | 11/2015 | Manthiram | H01M 2/1686 429/105 |

FOREIGN PATENT DOCUMENTS

| | | |
|---|---|---|
| CN | 103958402 A | 7/2014 |
| CN | 103972467 A | 8/2014 |
| CN | 104300128 A | 1/2015 |
| CN | 104577060 A | 4/2015 |
| DE | 10 2011 088 528 A1 | 6/2013 |

OTHER PUBLICATIONS

Song et al., "Flexible Freestanding Sandwich-Structured Sulfur Cathode with Superior Performance for Lithium-Sulfur Batteries," Journal of Materials Chemistry A, 2014, vol. 2, pp. 8623-8627.

Su et al., "A New Approach to Improve Cycle Performance of Rechargeable Lithium-Sulfur Batteries by Inserting a Free-Standing MWCNT Interlayer," Chem. Commun., 2012, vol. 48, pp. 8817-8819.

Su et al., "Lithium-Sulphur Batteries with a Microporous Carbon Paper as a Bifunctional Interlayer," Nature Communications, Nov. 6, 2012, pp. 1-6.

Wang et al., "Reduced Graphene Oxide Film as a Shuttle-Inhibiting interlayer in a Lithium-Sulfur Battery," Elsevier, Journal of Power Sources, 2013 (Available online May 25, 2013), vol. 242, pp. 65-69.

Zhang et al, "A Proof-of-Concept Lithium/Sulfur Liquid Battery with Exceptionally High Capacity Density," Elsevier, Journal of Power Sources, 2012 (Available online Apr. 13, 2012), vol. 211, pp. 169-172.

Zhou et al., "A Graphene-Pure-Sulfur Sandwich Structure for Ultrafast, Long-Life Lithium-Sulfur Batteries," Advanced Materials, 2014 (Published online Nov. 4, 2013), vol. 26, pp. 625-631.

* cited by examiner

ELECTRODE AND METHOD FOR MANUFACTURING THE SAME AND BATTERY

CROSS REFERENCE TO RELATED APPLICATIONS

The present application is based on, and claims priority from, Taiwan Application Serial Number 104140491, filed on Dec. 3, 2015, the disclosure of which is hereby incorporated by reference herein in its entirety.

TECHNICAL FIELD

The technical field relates to a lithium/sulfur battery, and in particular it relates to an electrode of the lithium/sulfur battery.

BACKGROUND

A lithium/sulfur (Li/S) battery has a theoretical capacitance being one order of magnitude higher than that of a $LiFePO_4$ battery. However, the Li/S system is not used in many applications. Before being used in a re-chargeable lithium battery, a sulfur positive electrode should overcome the following problems: (1) sulfur has a low electrical conductivity. The size of the sulfur should be small in order to ensure a high sulfur utilization and keep a high reversible capacitance during the charge-discharge cycles. (2) The intermediate product of the charge-discharge, e.g. polysulfide, should not dissolve into the electrolyte liquid for ensuring a long cycle lifetime. (3) The electrical conductivity of the positive electrode material should be enhanced for a higher rate capability of the battery.

For solving the problems listed above, one conventional method directly coats a carbon material on a sulfur carbon electrode by wet coating. However, a layered interface between the coated carbon material and the sulfur carbon electrode will dramatically increase the impedance of the electrode.

Accordingly, a novel electrode structure for solving the above problems is still called for.

SUMMARY

One embodiment of the disclosure provides an electrode, comprising: a sulfur- and carbon-containing layer including a carbon material, a sulfur material, and a binder, wherein a sulfur content at a core part of the sulfur- and carbon-containing layer is gradually reduced to a sulfur content at two side surfaces of the sulfur- and carbon-containing layer.

One embodiment of the disclosure provides a battery, comprising: a positive electrode, being the described electrode; a negative electrode; and an electrolyte liquid between the positive electrode and the negative electrode.

One embodiment of the disclosure provides a method of manufacturing an electrode, comprising: putting a sulfur carbon film between two carbon films and then calendaring them to form an electrode, wherein the electrode is a sulfur- and carbon-containing layer, wherein a sulfur content at a core part of the sulfur- and carbon-containing layer is gradually reduced to a sulfur content at two side surfaces of the sulfur- and carbon-containing layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
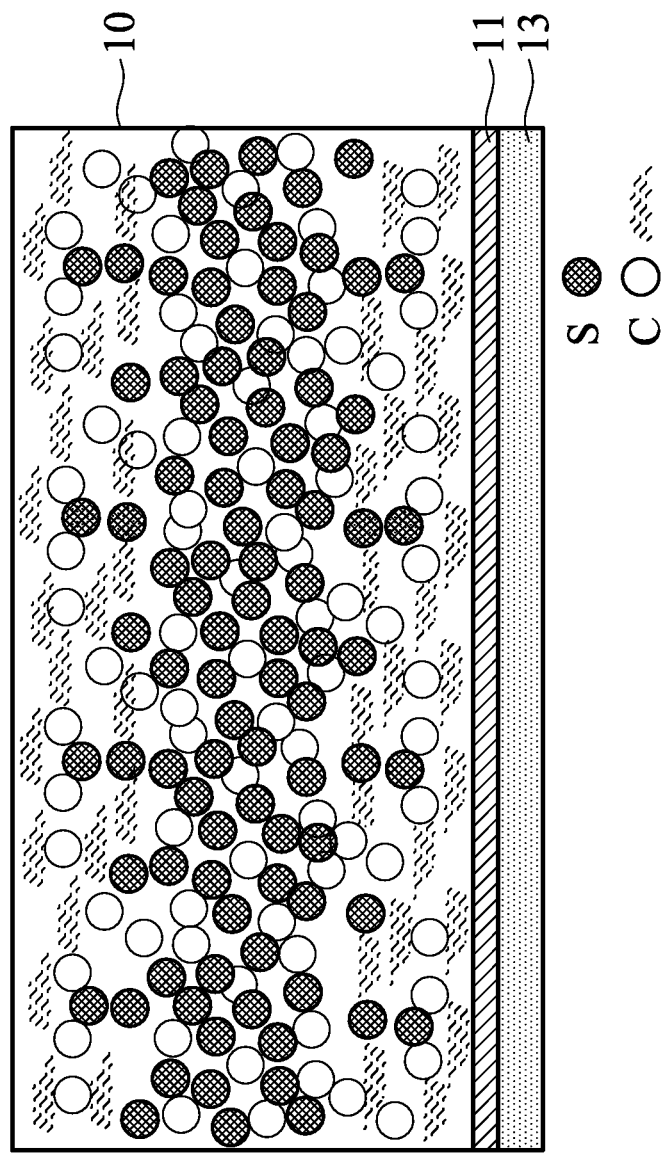
FIG. 1 shows an electrode in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one embodiment, a method of manufacturing an electrode is provided. First, a carbon material and a binder can be mixed and then calendared to form a carbon film. In one embodiment, the carbon material can be active carbon, conductive carbon black, porous carbon sheet, mesoporous carbon, carbon microcapsule, hallow carbon capsule, carbon nanotube, graphene, carbon fiber, sulfur carbon composite, or a combination thereof, and the binder can be polyvinylidene fluoride, polytetrafluoro ethylene, polyvinyl alcohol, polyethylene glycol, carboxymethyl cellulose, styrene-butadiene rubber, polyacrylate, polyacrylonitrile, alginic acid, or a combination thereof. In one embodiment, the carbon material and the binder have a weight ratio of 98:2 to 90:10. An overly high carbon material ratio makes the carbon film difficult to process, due to a low mechanical strength. An overly low carbon material ratio may reduce the electrical conductivity of the carbon film. In one embodiment, the calendaring step is performed at a pressure of 10 $kgf/cm^2$ to 1000 $kgf/cm^2$. An overly high pressure forms an overly dense carbon film, which cannot be calendared with a sulfur carbon film to form an electrode without a layered interface in a following step. An overly low pressure forms a carbon film easily broken to be discontinuous due to its poor mechanical strength. The carbon film formed by the calendaring step may have a thickness of 15 µm to 300 µm. The carbon film cannot be formed with an overly thin thickness. An overly thick carbon film may reduce the sulfur active material content in an electrode prepared from the carbon film.

Subsequently, a sulfur material, a carbon material, and a binder can be mixed and then calendared to form a sulfur carbon film. The carbon material and the binder are similar to that described above, and the description thereof is omitted here. In one embodiment, the sulfur material can be elemental sulfur, sulfide, sulfur carbon composite, or a combination thereof. For example, the sulfide can be sulfur-containing polymer, metal sulfide, or a combination thereof. The sulfur-containing polymer can be polythiophene or other polymers with a substituent group containing sulfur, e.g. polyaniline, polypyrrole, or polydopamine. The metal sulfide can be iron sulfide, cobalt sulfide, tin sulfide, copper sulfide, titanium sulfide, or a combination thereof. In one embodiment, the sulfur material occupies 50 to 90 parts by weight, the carbon material occupies 5 to 45 parts by weight, and the binder occupies 2 to 10 parts by weight on the basis of 100 parts by weight of their mixture. An overly high ratio of sulfur material may increases the impedance of the electrode to negatively influence the capacity performance of the battery. An overly low ratio of the sulfur material reduces the active material of the electrode, thereby lowering the battery capacity. In one embodiment, the calendaring step is performed at a pressure of 10 kgf/cm$^2$ to 1000 kgf/cm$^2$. An overly high pressure forms an overly dense sulfur carbon film, which cannot be calendared with the carbon film to form an electrode without a layered interface in a following step. An overly low pressure forms a sulfur carbon film easily broken to be discontinuous due to its poor mechanical strength. The sulfur carbon film formed by the calendaring step may have a thickness of 20 µm to 1200 µm. An overly thin sulfur carbon film will lower the sulfur active material amount in the electrode, thereby lowering the battery capacity. An overly thick sulfur carbon film increases the impedance of the electrode, thereby negatively influencing the capacity performance of the battery.

Next, the sulfur carbon film is disposed between the two carbon films, and then calendared to form an electrode. In one embodiment, there are several sulfur carbon films with different sulfur/carbon ratios disposed between the two carbon films, and the sulfur carbon film closer to a core part has a higher sulfur ratio. In one embodiment, the calendaring step is performed at a pressure of 10 kgf/cm$^2$ to 1000 kgf/cm$^2$. An overly high pressure will make the sulfur active material in the electrode unevenly distributed. An overly low pressure cannot make the sulfur carbon film and the carbon films form an electrode as a whole, so the interface impedance problem still occurs. The electrode formed by the calendaring step may have a thickness of 20 µm to 300 µm. An overly thick electrode may inhibit migration and transfer of the ions and electrons in the electrode. It is not easy to prepare a battery element from an overly thin electrode. As shown in FIG. 1, the electrode is a sulfur- and carbon-containing layer 10, which includes the sulfur material, the carbon material, and the bonder. The sulfur content at a core part of the sulfur- and carbon-containing layer 10 is gradually reduced to a sulfur content at two side surfaces of the sulfur- and carbon-containing layer 10. In short, the sulfur- and carbon-containing layer 10 has a gradient composition. For example, the core part of the sulfur- and carbon-containing layer 10 has a sulfur content of 30 wt % to 90 wt %, and the two side surfaces of the sulfur- and carbon-containing layer 10 has a sulfur content of 0 wt % to 10 wt %. Note that the sulfur- and carbon-containing layer 10 is free of a layered interface therein. For example, a first location of the sulfur- and carbon-containing layer 10 and a second location adjacent to the first location (along the direction perpendicular to the surface of the sulfur- and carbon-containing layer 10) have a sulfur content difference of greater than 0 and less than 5 wt %. If the carbon films and/or the sulfur carbon film are calendared by an overly high pressure before the stacking step, or only stacking the carbon film/sulfur carbon film/carbon film without calendaring, the carbon films and the sulfur carbon film in the electrode will have layered interfaces therebetween. The layered interface dramatically increases the battery impedance.

In one embodiment, the electrode optionally includes a current collector layer 13 and a conductivity promoter layer 11, wherein the conductivity promoter layer 11 is disposed between the current collector layer 13 and the sulfur- and carbon-containing layer 10. For example, the current collector layer 13 includes a metal foil (e.g. aluminum foil, copper foil, nickel foil, titanium foil, or stainless foil) or a metal mesh (e.g. aluminum mesh, copper mesh, nickel mesh, titanium mesh, or stainless mesh). The conductivity promoter layer 11 includes a carbon material and a binder. The carbon material and the binder are similar to that described above, and the description thereof is omitted here. In one embodiment, 90 to 98 parts by weight of the carbon material and 2 to 10 parts by weight of the binder are mixed in a solvent such as water, alcohol, ketone, aldehyde, organic acid, or NMP to form a slurry with a solid content of 1 wt % to 20 wt %. The slurry is coated on a metal foil, and then air-dried at room temperature or thermally dried to form the conductivity promoter layer 11 with a thickness of 0.5 µm to 5 µm. An overly thick conductivity promoter layer 11 may increase the impedance of the conductivity promoter layer. An overly thin conductivity promoter layer 11 cannot provide a conductivity promoter effect.

Figure 2:
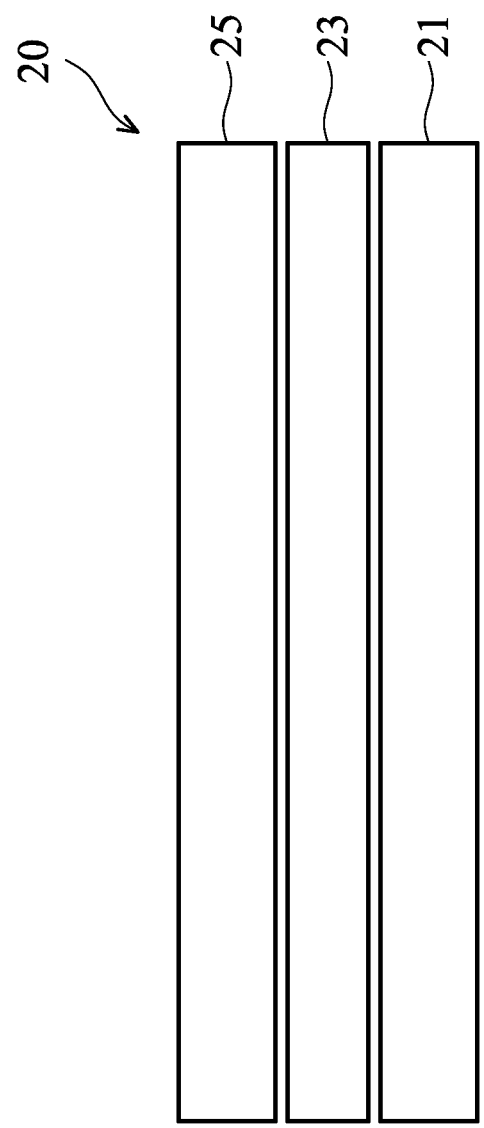
FIG. 2 shows a battery in one embodiment of the disclosure.

In one embodiment, the electrode may serve as a positive electrode 21 of a battery 20, as shown in FIG. 2. The battery 20 also includes a negative electrode 25, and an electrolyte liquid 23 between the positive electrode 21 and the negative electrode 25. In one embodiment, the negative electrode 25 may include lithium, carbon, silicon, tin, germanium, or a combination thereof. In one embodiment, a separator film (not shown) can be disposed between the positive electrode 21 and the negative electrode 25 to prevent the electrodes from contacting to each other (short). As proven in experiments, the battery with the described electrode served as the positive electrode has a high conductivity. Moreover, the capacitance of the battery is kept to be sufficient after several charge-discharge cycles.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Figure 3:
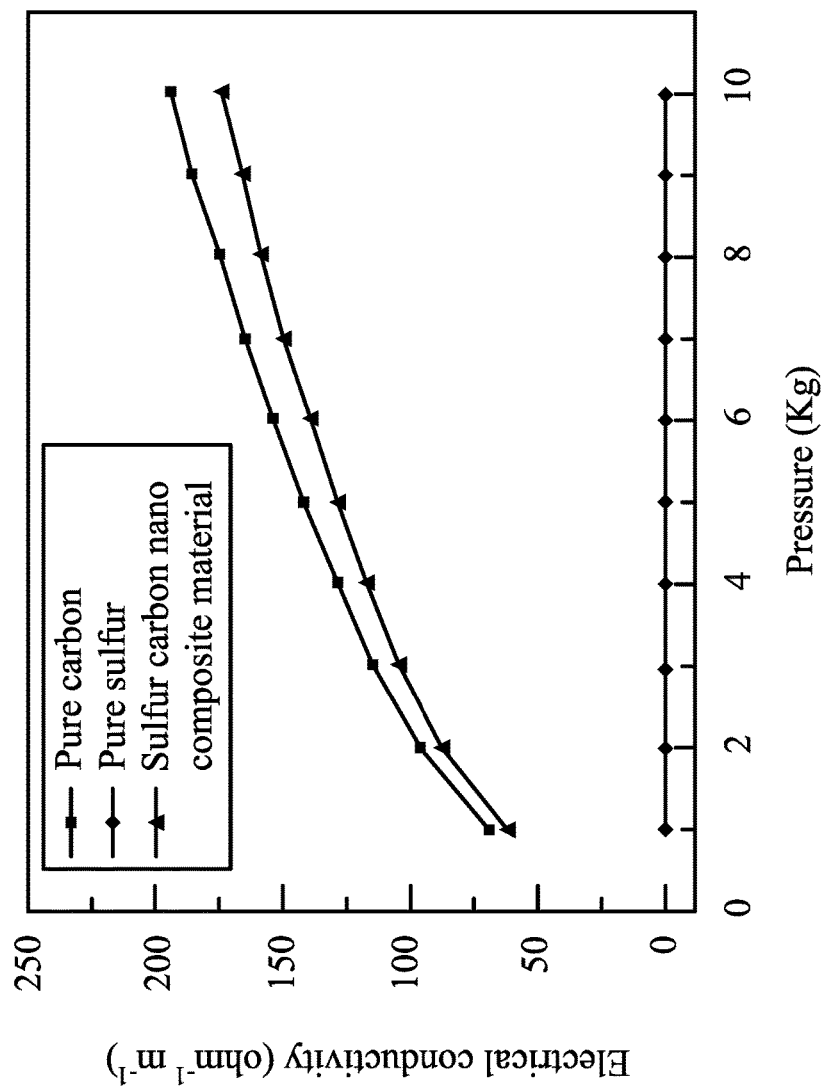
FIG. 3 shows curves of electrical conductivity versus pressure of pure sulfur, pure carbon, and sulfur carbon composite in one embodiment of the disclosure.

Preparation Example 1 g of a carbon material (active carbon ACS25, commercially available from China steel chemical Co.) was dispersed in water to form a dispersion. 0.125 mole of $Na_2S_2O_3 \cdot 5H_2O$ was dissolved in the dispersion. 0.25 mole of HCl was then dropwise added into the aqueous solution to be stirred and reacted for 2 hours. The reaction result was filtered, and the filtered cake was washed by de-ionized water and then baked to dry, thereby obtaining a sulfur carbon nano composite. The sulfur carbon nano composite had a sulfur content of 77.2 wt %, which was determined by thermogravimetric analysis (TGA). The sulfur carbon nano composite had a size of about 15 nm, which was determined by scanning electron microscope (SEM). The pure sulfur, the pure carbon, and the sulfur carbon composite were calendared to form films, respectively. The curves of electrical conductivities versus the pressures of the pure sulfur film, the pure carbon film, and the sulfur carbon film are shown in FIG. 3. The sulfur carbon composite had an electrical conductivity similar to that of the pure carbon, and dramatically higher than that of the pure sulfur.

Example 1

Monolayered Electrode with a Gradient Composition 94 parts by weight of a carbon material (active carbon ACS25, commercially available from China steel chemical Co.), 1 part by weight of conductive carbon (graphene P-MF10, commercially available from Enerage Inc.), and 5 parts by weight of a binder (polytetrafluoro ethylene, commercially available from Sigma-Aldrich) were mixed and then calendared to form a carbon film with a thickness of 100 μm.

70 parts by weight of the sulfur carbon nano composite material in Preparation Example, 24 parts by weight of a carbon material (active carbon ACS25, commercially available from China steel chemical Co.), 1 part by weight of conductive carbon (graphene P-MF10, commercially available from Enerage Inc.), and 5 parts by weight of a binder (polytetrafluoro ethylene, commercially available from Sigma-Aldrich) were mixed and then calendared to form a sulfur carbon film with a thickness of 500 μm.

Figure 4:
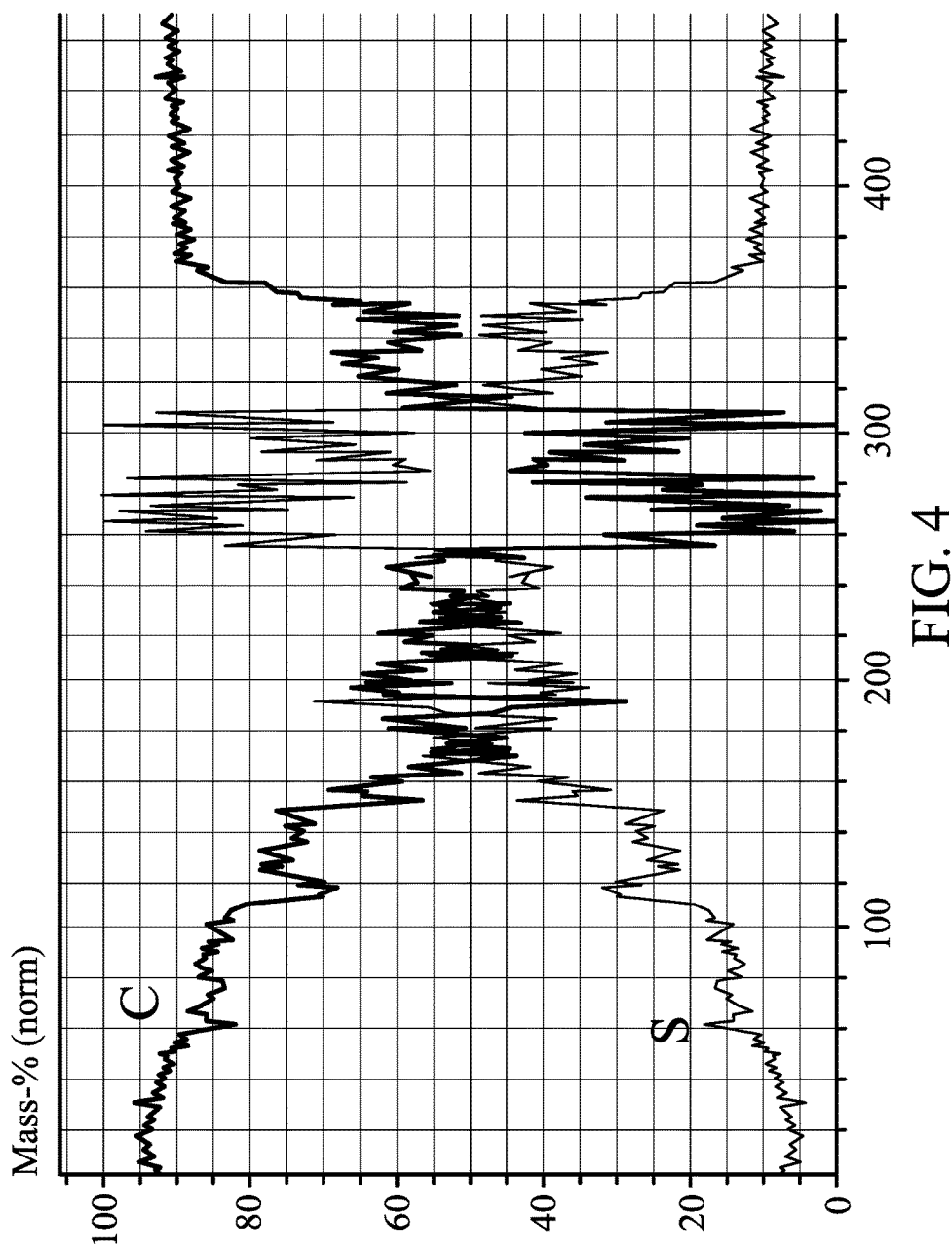
FIG. 4 shows sulfur/carbon atomic ratios at different depths of an electrode in one embodiment of the disclosure.

The sulfur carbon film was disposed between the two carbon films, and then co-calendared to form an electrode with a thickness of 50 μm. The sulfur/carbon elemental ratios at different depths of the electrode were analyzed by SEM, as shown in FIG. 4. The electrode formed by the co-calendaring step is free of an obvious interface therein. A sulfur content at a core part of the electrode is gradually reduced to a sulfur content at two side surfaces of the electrode. A carbon content at a core part of the electrode is gradually increased to a carbon content at two side surfaces of the electrode.

Figure 5:
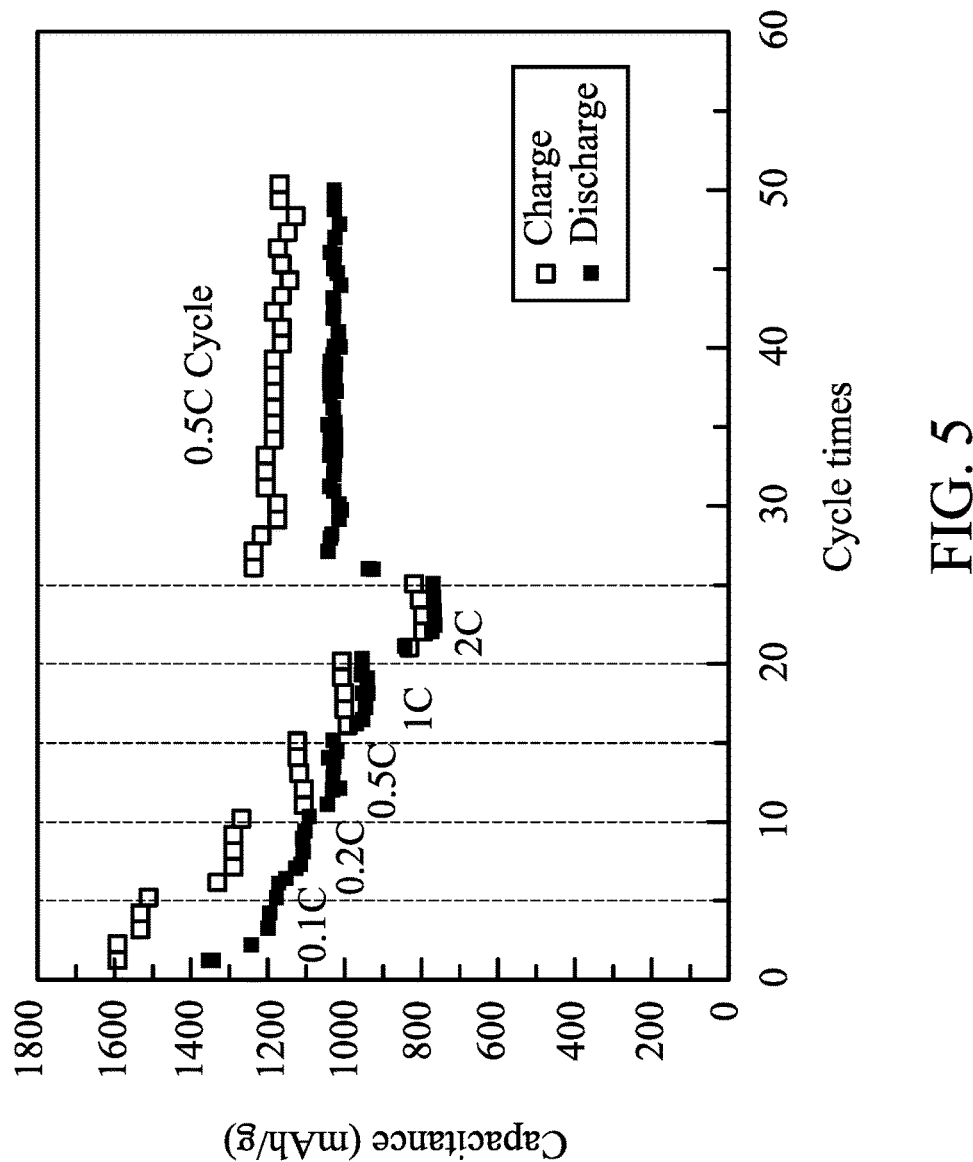
FIG. 5 shows charge-discharge capacitances of a battery after several charge-discharge cycles of different charge-discharge rates in one embodiment of the disclosure.
Figure 6:
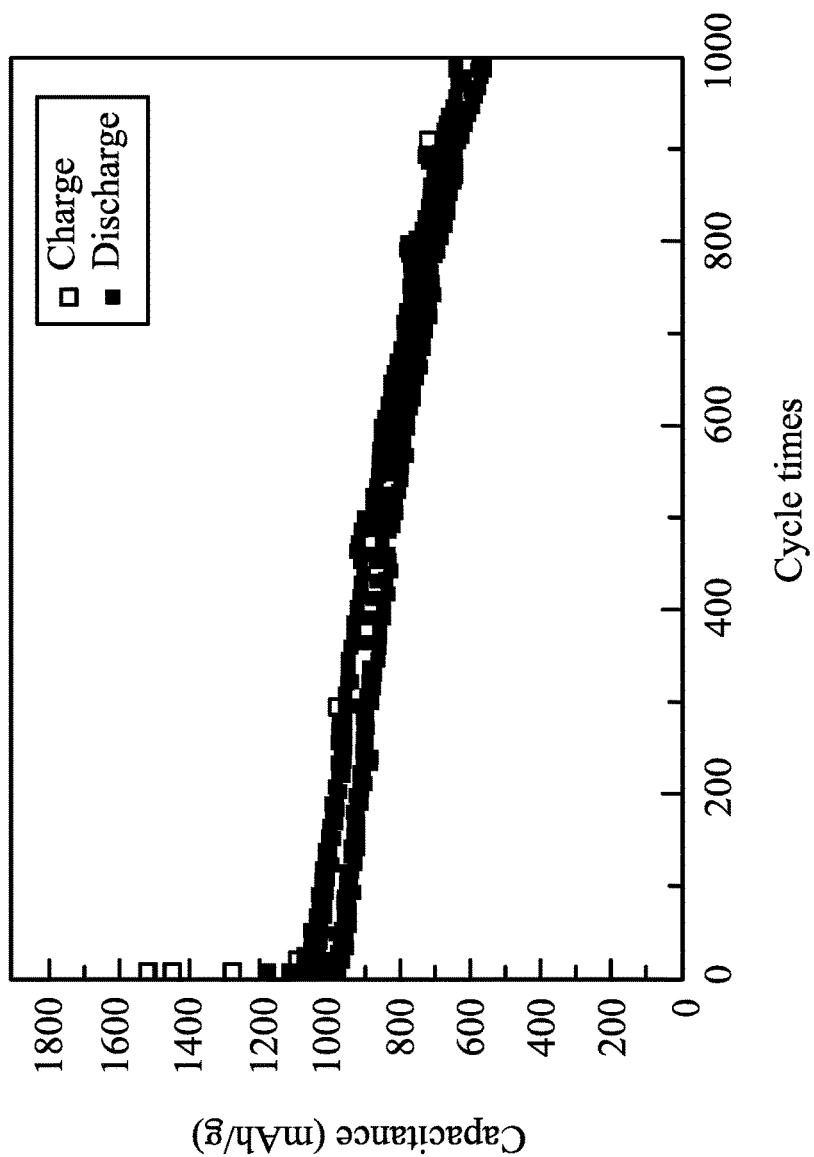
FIG. 6 shows the capacitance of a battery after several charge-discharge cycles of 0.5 C in one embodiment of the disclosure.
Figure 7:
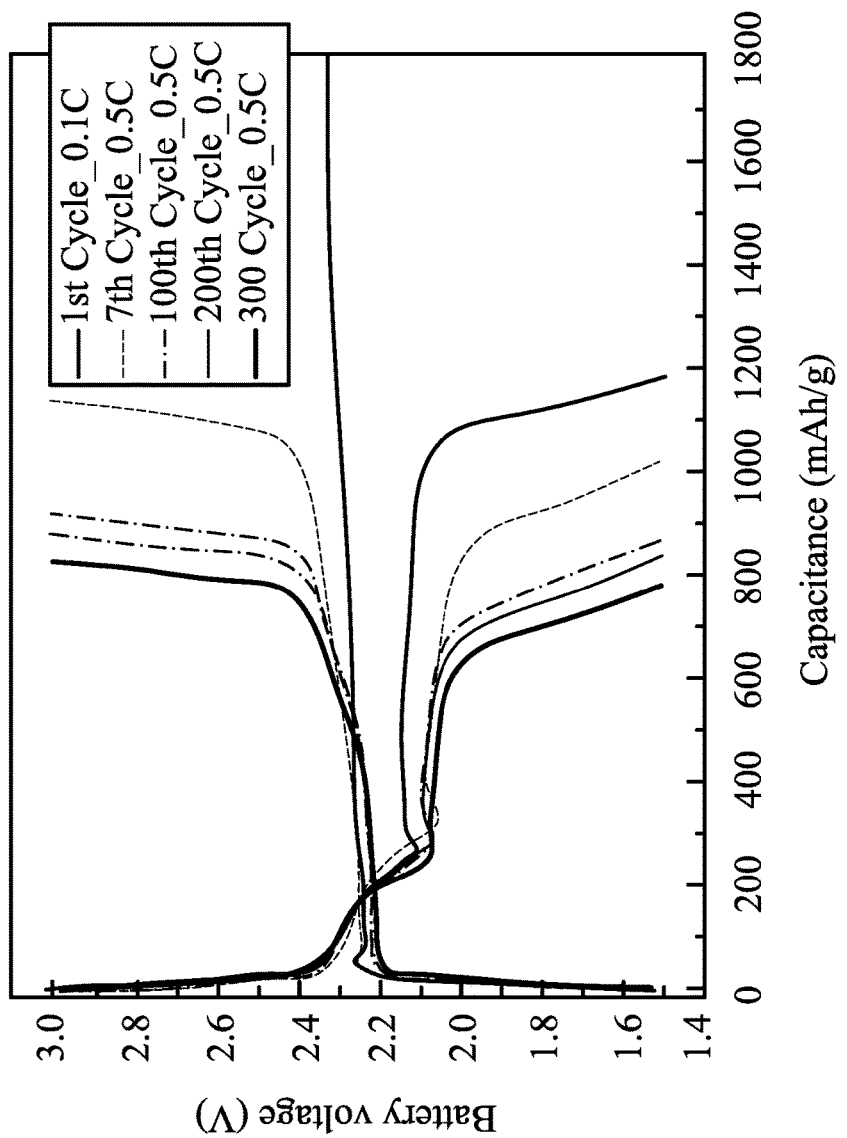
FIG. 7 shows charge-discharge curves of a battery during different cycle times in one embodiment of the disclosure.

90 parts by weight of conductive carbon (graphite TIM-REX, commercially available from TIMCAL) and 10 parts by weight of a binder (polytetrafluoro ethylene, commercially available from Sigma-Aldrich) were dispersed in a volatile solvent (NMP, commercially available from BASF) to form a slurry with a solid content of 10 wt %. The slurry was coated on an aluminum foil, and then dried to form a bi-layered structure of a conductivity promoter layer (carbon layer) and a current collector layer (aluminum foil), wherein the conductivity promoter layer had a thickness of 2 μm. The electrode was put on the conductivity promoter layer (overlying the current collector layer) to form a positive electrode. A separator film (2320, commercially available from Celgard) was disposed between the above positive electrode and a negative electrode (LectroMax100, commercially available from FMC Lithium) and then packaged. An electrolyte liquid was added into the package to form a battery. The electrolyte liquid included 1.75M of lithium salt (Lithium bis(trifluoromethane sulfonyl) imide) in a solvent mixture of 1,3-epoxy pentane and 1,2-dimethoxyethane (1/1). Charge-discharge cycles of the battery were tested by a constant current at 35° C., the cut-off voltages of the charge and discharge were 3V and 1.5V, and the charge-discharge rates were different (0.1 C to 2 C). The charge-discharge capacitances of the battery after several charge-discharge cycles of different charge-discharge rates are shown in FIG. 5. Even if the charge-discharge rate was enhanced to 2 C, the battery still had a capacitance of 800 mAh/g. The charge-discharge cycle of the battery tested by a charge-discharge rate of 0.5 C is shown in FIG. 6. The battery still had a capacitance of 600 mAh/g after 1000 charge-discharge cycles, and the average capacitance loss of each charge-discharge cycle was only 0.035%. This means that the battery was quite stable. In addition, the charge-discharge curves of the battery after different charge-discharge cycles are shown in FIG. 7.

Comparative Example 1

Tri-Layered Electrode 94 parts by weight of a carbon material (active carbon ACS25, commercially available from China steel chemical Co.), 1 part by weight of conductive carbon (graphene P-MF10, commercially available from Enerage Inc.), and 5 parts by weight of a binder (polytetrafluoro ethylene, commercially available from Sigma-Aldrich) were mixed and then calendared to form a carbon film with a thickness of 15 μm.

70 parts by weight of the sulfur carbon nano composite material in Preparation Example, 24 parts by weight of a carbon material (active carbon ACS25, commercially available from China steel chemical Co.), 1 part by weight of conductive carbon (graphene P-MF10, commercially available from Enerage Inc.), and 5 parts by weight of a binder (polytetrafluoro ethylene, commercially available from Sigma-Aldrich) were mixed and then calendared to form a sulfur carbon film with a thickness of 20 μm.

The sulfur carbon film was disposed between the two carbon films to stack an electrode with a thickness of 50 μm. While the carbon films and the sulfur carbon film were calendared to dense films before stack, the tri-layered structure could not be further calendared to form an electrode free of layered interfaces therein. As such, the carbon films and the sulfur carbon film had layered interfaces therebetween.

Comparative Example 2

Figure 8:
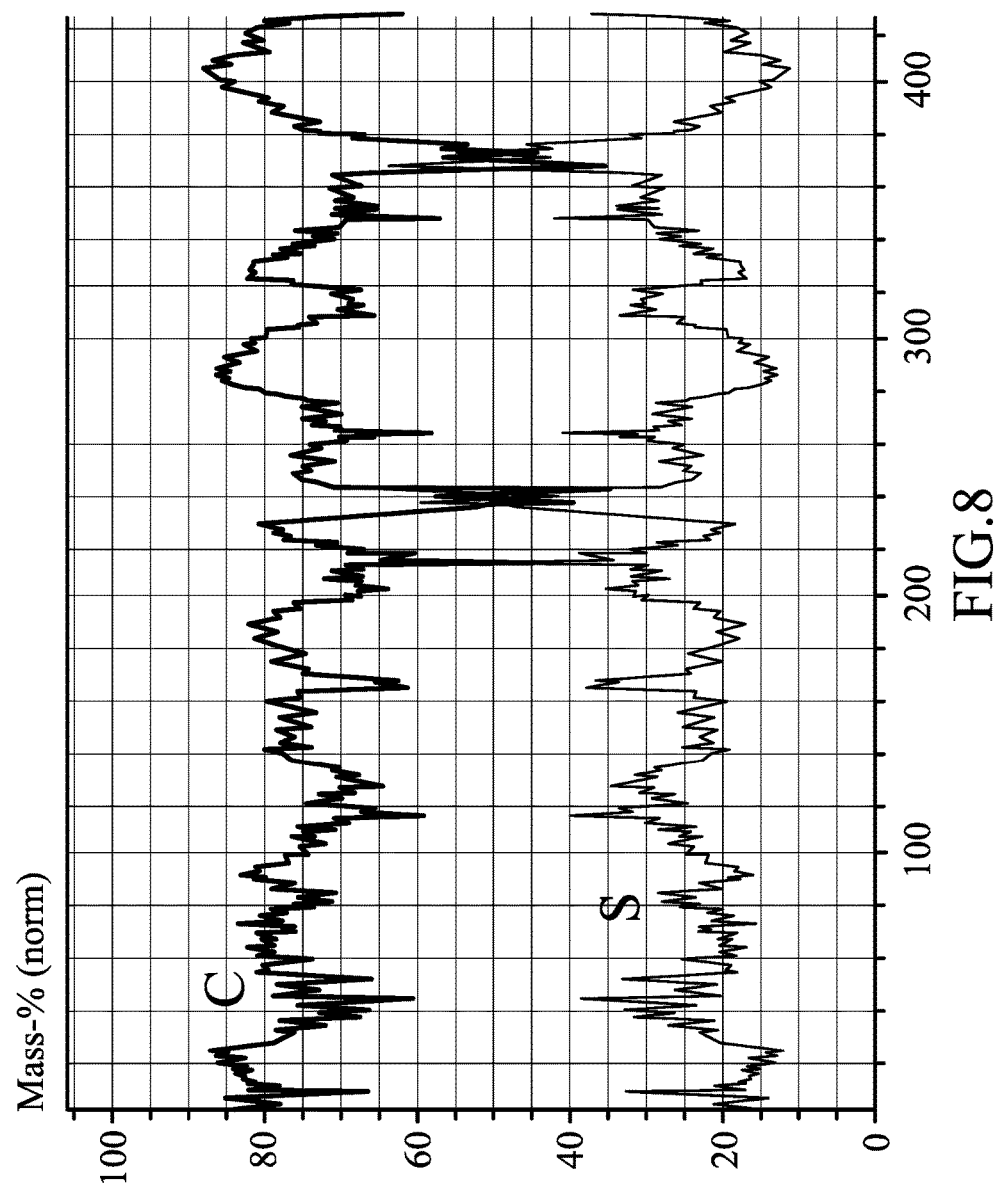
FIG. 8 shows sulfur/carbon atomic ratios at different depths of an electrode in one embodiment of the disclosure.

Monolayered Electrode with a Uniform Composition 50 parts by weight of the sulfur carbon nano composite material in Preparation Example, 44 parts by weight of a carbon material (active carbon ACS25, commercially available from China steel chemical Co.), 1 part by weight of conductive carbon (graphene P-MF10, commercially available from Enerage Inc.), and 5 parts by weight of a binder (polytetrafluoro ethylene, commercially available from Sigma-Aldrich) were mixed and then calendared to form a monolayered electrode with a thickness of 50 μm. The sulfur/carbon elemental ratios at different depths of the electrode were analyzed by SEM, as shown in FIG. 8. A sulfur content at a core part of the electrode was substantially similar to that at two side surfaces of the electrode, and a carbon content at a core part of the electrode was substantially similar to that at two side surfaces of the electrode.

Figure 9:
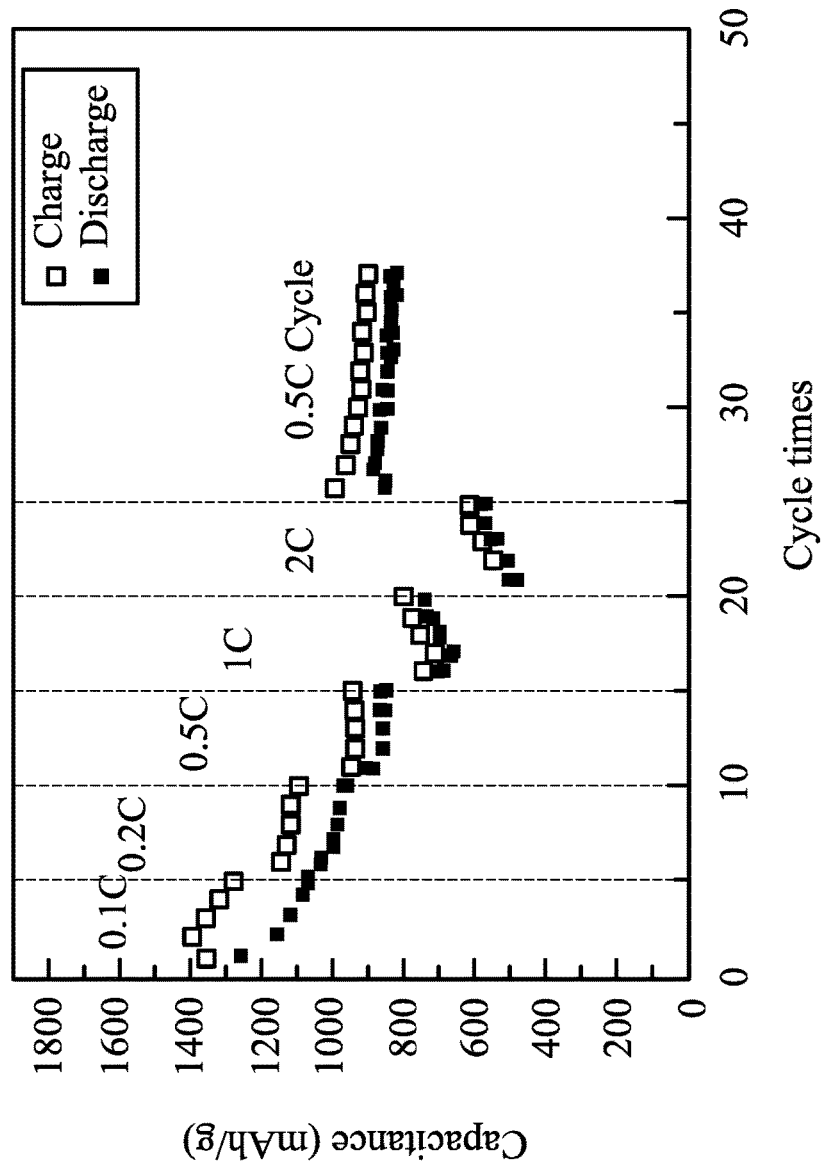
FIG. 9 shows charge-discharge capacitances of a battery after several charge-discharge cycles of different charge-discharge rates in one embodiment of the disclosure.
Figure 10:
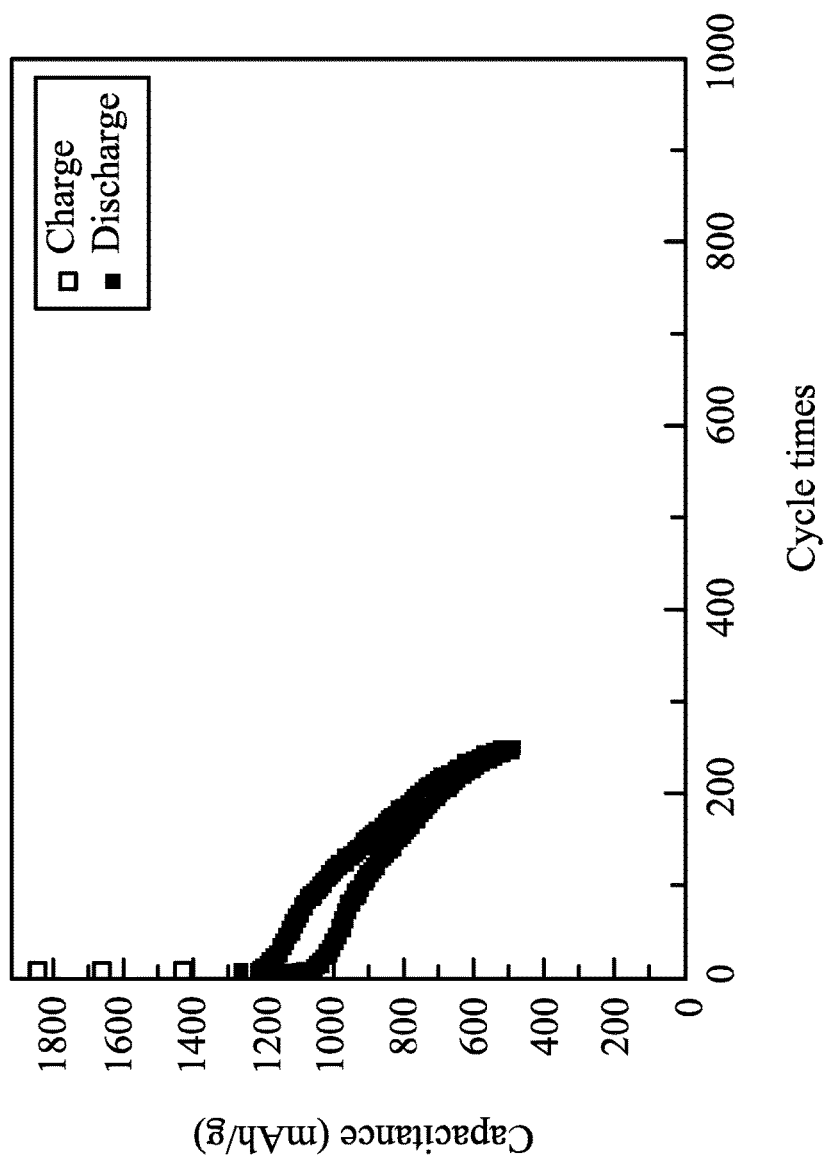
FIG. 10 shows the capacitance of a battery after several charge-discharge cycles of 0.5 C in one embodiment of the disclosure.

A battery is manufactured by a method similar to that in Example 1. In Comparative Example 2, the negative electrode, the electrolyte, the current collector layer, and the conductivity promoter layer were similar to that in Example 1. The only difference in Comparative Example 2 was the electrode was the monolayered electrode with a uniform composition. Charge-discharge cycles of the battery were tested by a constant current at 35° C., the cut-off voltages of the charge and discharge were 3V and 1.5V, and the charge-discharge rates were different (0.1 C to 2 C). The charge-discharge capacitances of the battery after several charge-discharge cycles of different charge-discharge rates are shown in FIG. 9. When the charge-discharge rate was enhanced to 2 C, the battery only had a capacitance of 600 mAh/g. The charge-discharge cycle of the battery tested by a charge-discharge rate of 0.5 C is shown in FIG. 10.

Figure 11:
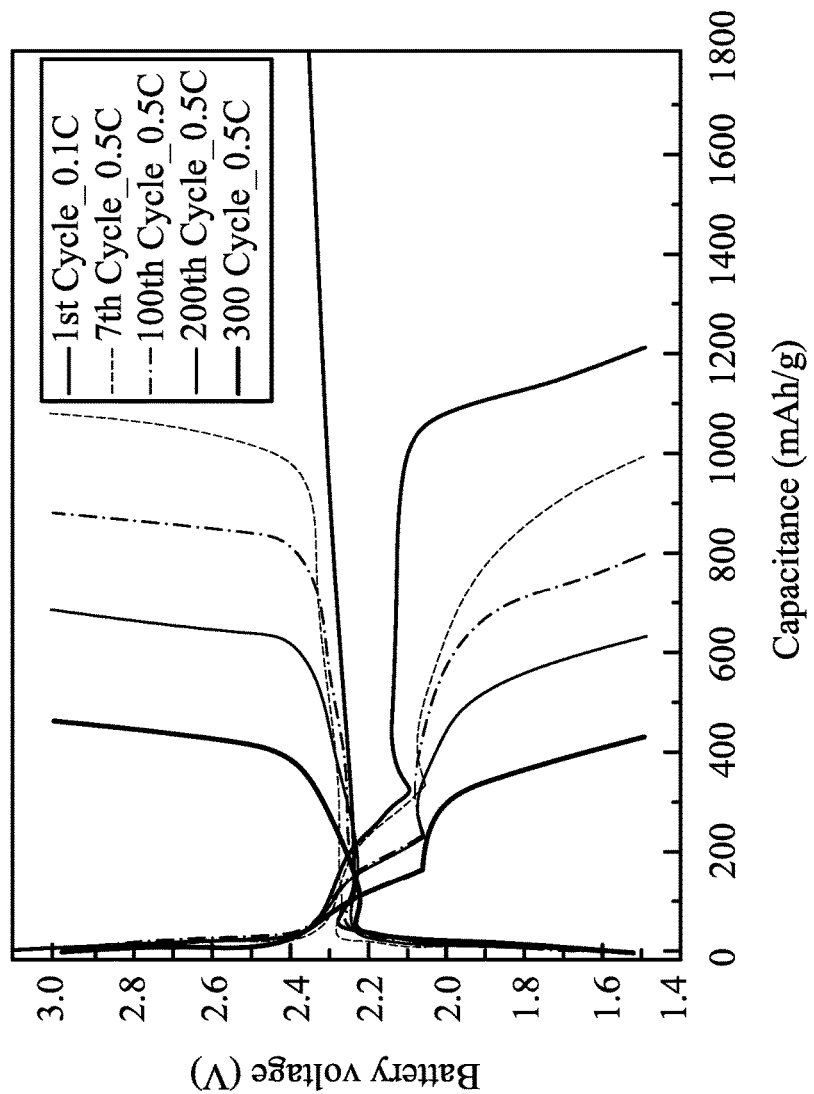
FIG. 11 shows charge-discharge curves of a battery during different cycle times in one embodiment of the disclosure.

The battery only had a capacitance of 400 mAh/g after 250 charge-discharge cycles, and the average capacitance loss of each charge-discharge cycle was 0.22%. This means that the battery was unstable. In addition, the charge-discharge curves of the battery after different charge-discharge cycles are shown in FIG. 11. Comparing FIGS. 7 and 11, the battery in Example 1 had a better charge-discharge performance than that of the battery in Comparative Example 2. As proven by the stable charge-discharge performance after several charge-discharge cycles of the battery in Example 1, a sulfur compound captured by the carbon material of the sulfur- and carbon-containing layer in an electrochemical reaction is released for a further electrochemical reaction. The positive electrode in Example 1 had a smaller polarization phenomenon (difference between the charge voltage and the discharge voltage) than that of the electrode in Comparative Example 2. The above comparison proves that the electrode with the gradient composition improved the electronic/ionic conductivity rate in the electrode, thereby enhancing the battery performance.

Figure 12:
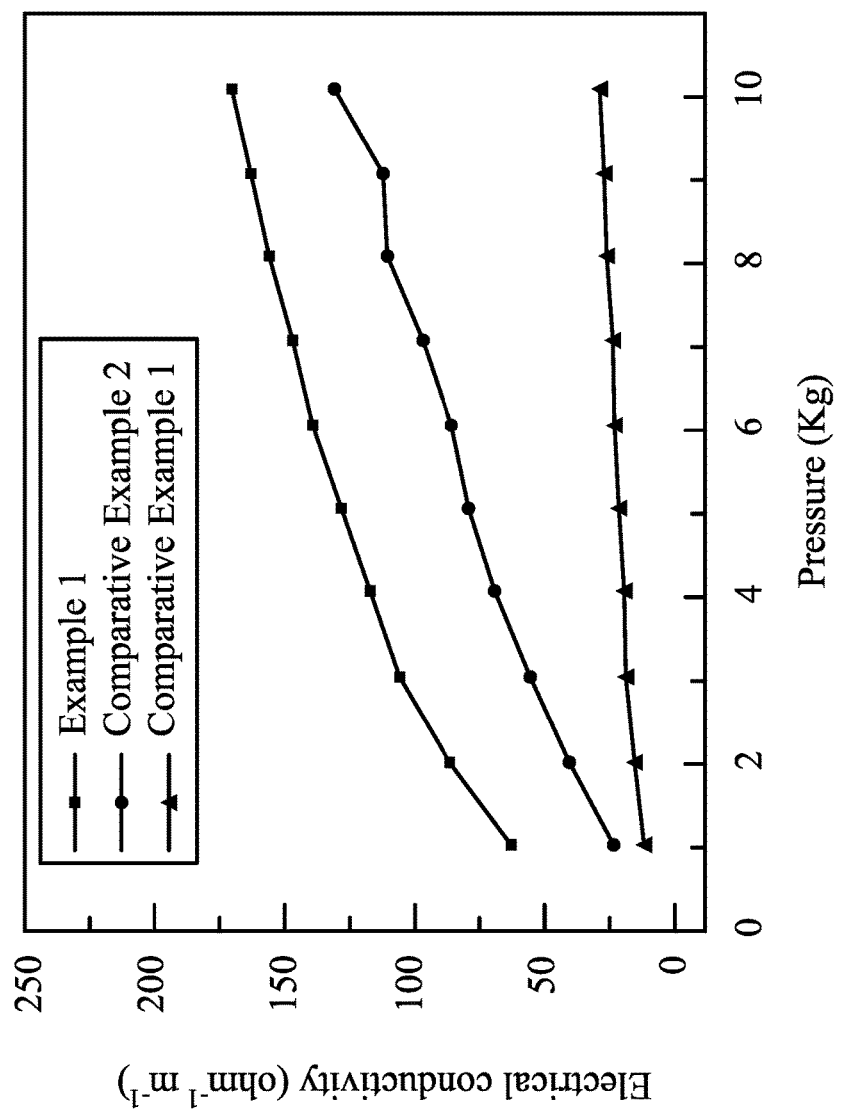
FIG. 12 shows curves of electrical conductivity versus pressure of electrodes in different embodiments of the disclosure.

In addition, the electrical conductivities of the monolayered electrode with the gradient composition in Example 1, the tri-layered electrode in Comparative Example 1, and the monolayered electrode with the uniform composition under different pressures are shown in FIG. 12. As shown in FIG. 12, the monolayered electrode with the gradient composition had a higher electrical conductivity. The tri-layered electrode in Comparative Example 1 had overly high interface impedance.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A sulfur- and carbon-containing layer, consisting of:
   a carbon material, a sulfur material, and a binder,
   wherein a sulfur content at a core part of the sulfur- and carbon-containing layer is gradually reduced to a sulfur content at two side surfaces of the sulfur- and carbon-containing layer,
   wherein the sulfur- and carbon-containing layer is free of a layered interface therein, and
   wherein a sulfur compound captured by the carbon material of the sulfur- and carbon-containing layer in an electrochemical reaction is released for a further electrochemical reaction.

2. The sulfur- and carbon-containing layer as claimed in claim 1, wherein the sulfur material is elemental sulfur, sulfide, sulfur carbon composite, or a combination thereof.

3. The sulfur- and carbon-containing layer as claimed in claim 1, wherein the carbon material is active carbon, conductive carbon black, porous carbon sheet, mesoporous carbon, carbon microcapsule, hallow carbon capsule, carbon nanotube, graphene, carbon fiber, sulfur carbon composite, or a combination thereof.

4. The sulfur- and carbon-containing layer as claimed in claim 1, wherein the binder is polyvinylidene fluoride, polytetrafluoro ethylene, polyvinyl alcohol, polyethylene glycol, carboxymethyl cellulose, styrene-butadiene rubber, polyacrylate, polyacrylonitrile, alginic acid, or a combination thereof.

5. The sulfur- and carbon-containing layer as claimed in claim 1, wherein the sulfur content at the core part of the sulfur- and carbon-containing layer is between 30wt % to 90wt %, and the sulfur content at the two side surfaces of the sulfur- and carbon-containing layer is between 0wt % to 10wt %.

6. An electrode, consisting of:
   a sulfur- and carbon-containing layer consisting of a carbon material, a sulfur material, and a binder, wherein a sulfur content at a core part of the sulfur- and carbon-containing layer is gradually reduced to a sulfur content at two side surfaces of the sulfur- and carbon-containing layer;
   a current collector layer; and
   a conductivity promoter layer, wherein the conductivity promoter layer is disposed between the current collector layer and the sulfur- and carbon-containing layer,
   wherein a sulfur compound captured by the carbon material of the sulfur- and carbon-containing layer in an electrochemical reaction is released for a further electrochemical reaction.

7. The electrode as claimed in claim 6, wherein the current collector layer is metal foil or metal mesh.

8. The electrode as claimed in claim 6, wherein the conductivity promoter layer consists of a carbon material and a binder.

9. A battery, comprising:
   a positive electrode, being the electrode as claimed in claim 6;
   a negative electrode; and
   an electrolyte liquid between the positive electrode and the negative electrode.

10. A method of manufacturing a sulfur- and carbon-containing layer, consisting of:
    putting a sulfur carbon film between two carbon films and then calendaring them to form a sulfur- and carbon-containing layer,
    wherein a sulfur content at a core part of the sulfur- and carbon-containing layer is gradually reduced to a sulfur content at two side surfaces of the sulfur- and carbon-containing layer,
    wherein the sulfur- and carbon-containing layer is free of a layered interface therein, and
    wherein a sulfur compound captured by the carbon material of the sulfur- and carbon-containing layer in an electrochemical reaction is released for a further electrochemical reaction.

11. The method as claimed in claim 10, wherein the sulfur carbon film consists of a sulfur material, a carbon material, and a binder.

12. The method as claimed in claim 10, wherein the carbon films consist of a carbon material and a binder.

\* \* \* \* \*